(No Model.)
F. L. POPE.
DYNAMO ELECTRIC TELEGRAPH.
No. 250,838. Patented Dec. 13, 1881.
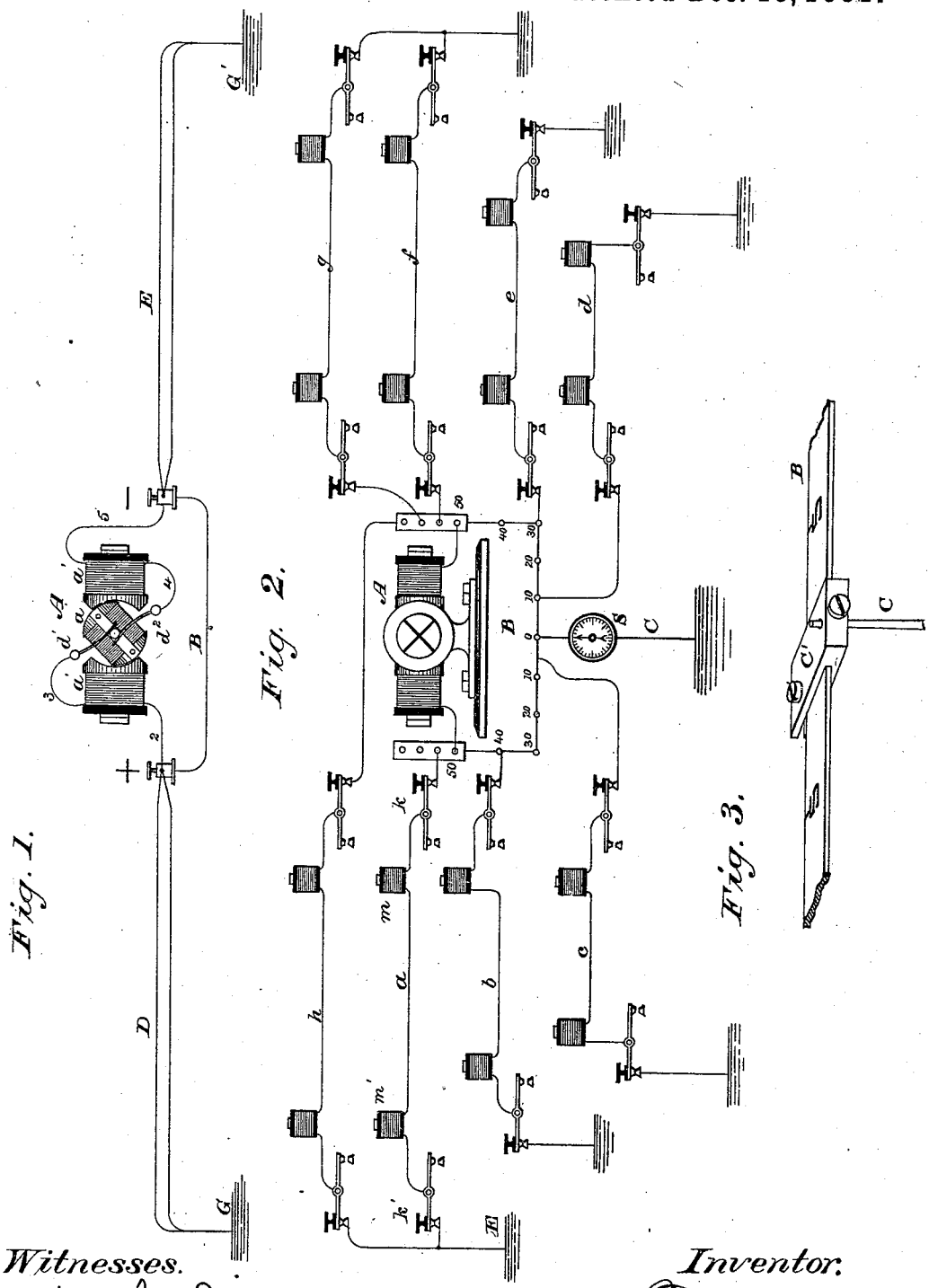
Witnesses.
Miller C. Earl
Rowena C. Gould
Inventor.
Frank L. Pope

UNITED STATES PATENT OFFICE.

FRANK L. POPE, OF ELIZABETH, NEW JERSEY.

DYNAMO-ELECTRIC TELEGRAPH.

SPECIFICATION forming part of Letters Patent No. 250,838, dated December 13, 1881.

Application filed May 7, 1881. (No model.)

*To all whom it may concern:*

Be it known that I, FRANK L. POPE, a citizen of the United States, residing at Elizabeth, in the county of Union and State of New Jersey, have invented certain new and useful Improvements in Dynamo-Electric Telegraphy, of which the following is a specification.

My invention relates to the application of dynamo-electric generators to the production of electric currents for operating telegraph-lines.

Certain inconveniences have heretofore resulted from the practical use of the various organizations of circuits which have been devised for the above-named purpose. It has not generally been found economical to employ dynamo-electric generators in telegraphy, except at large and important telegraphic centers, from which a great number of independent lines or circuits diverge in various directions and extend to different points. These different lines necessarily differ greatly from each other in respect to their actual length, their electrical resistance, the strength of electric current required to operate different species of instruments which are employed for transmitting signals through them, and also in respect to the polarity of the electric current required, whether positive or negative. It has heretofore been found impracticable to meet all these different requirements by the use of a single dynamo-electric generator at the central station.

In order to obtain currents of the various degrees of initial strength required for the proper operation of lines of different lengths, a number of generators coupled together in series have been employed, and artificial resistances or rheostats have been inserted in the shorter lines in order to increase their total resistance, and thus insure a more equal division of the current between the longer and shorter lines. In this arrangement one generator or series of generators may be made to supply the current for any required number of lines of different lengths and resistances, provided the same polarity of current is required upon each one; but in case additional lines of opposite polarity are to be provided for, an independent generator or series of generators has been employed for the purpose.

My invention comprises, generally speaking, an organization of circuits whereby any required number of telegraph-lines may be supplied with electricity from a single generator, without reference to the length or resistance of the wires, the strength of current required to operate them, or the polarity of the current required, whether positive or negative. By this means I dispense with all duplicate or independent generators and artificial resistances, and am enabled to supply each line with the precise strength of current which is required to operate it most advantageously, and at the same time to maintain a uniform and constant strength of current upon each individual line after the apparatus has once been properly adjusted and set in action.

My invention consists, first, in the combination of a dynamo-electric generator, a shunt-conductor permanently uniting the opposite poles of said generator, whereby the circuit through the armature and field-magnet is kept continuously closed, and two or more independent telegraphic lines connected with each pole of the generator and terminating in the earth at their remote ends, whereby one group of lines may be supplied with positive and another like group with negative electricity from the same generator, each individual line forming one of its earth-connections through the generator and the group of lines connected with the opposite pole thereof; second, in the combination of a dynamo-electric generator, a shunt-conductor permanently uniting the opposite poles of said generator, and two or more telegraph-lines connected with each of the opposite poles of the generator and terminating in the earth at their remote ends, whereby one group of lines can be supplied with positive electricity and another like group with negative electricity from the same generator, and an earth-wire connected to said shunt at or near its zero-point of potential, whereby any individual line of either group is enabled to make its earth-connection through said earth-wire in case all the lines of the group attached to the opposite pole of the generator should become disconnected; third, in the combination of a dynamo-electric generator with a shunt-conductor permanently uniting its opposite poles, an earth-wire connected to said shunt at or near its zero of potential, and one or more telegraph-lines attached to said shunt-conductor between one pole of the generator and the earth-wire; fourth, in the combination of an earth-wire connected to a shunt-conductor permanently uniting the opposite poles of a dynamo-electric generator, with a galvanoscope included in its circuit, whereby the point of attachment of said earth-wire with reference to the actual zero-point of potential in the shunt-conductor may be accurately ascertained and its adjustment facilitated.

In the accompanying drawings, Figures 1 and 2 are diagrams illustrating the application of my invention to a system of telegraph-lines, and Fig. 3 is a perspective view of a portion of the shunt-conductor.

Referring to Fig. 1, A represents a dynamo-electric generator, which may be of any suitable or well-known construction, and may be driven by the power of a steam-engine or other suitable motor in the usual manner. The form of generator which I prefer to employ has its several component parts joined together upon the principle shown in detail in Fig. 1, in which $a$ is a revolving armature enveloped in coils of wire, and which moves within the magnetic field of the stationary or field magnets $a'\ a'$. The positive and negative poles of the generator are designated by the algebraic signs $+$ and $-$, respectively. The electric circuit through the generator is as follows: Commencing at the positive pole, it passes by the wire 2 to the coils of the field-magnets $a'$, thence by wire 3 to the commutator-spring $d'$, thence through the coils of the revolving armature $a$, thence by commutator-spring $d^2$ and wire 4 to the other field-magnet $a'$, and thence by wire 5 to the negative pole of the generator. Now, if the armature $a$ be set in motion, no effect is produced until the opposite poles of the generator are united by a conductor; but whenever they are so united—as, for example, by the conductor B in Fig. 1—a feeble electric current is excited by the coils of the armature $a$, which also traverses the field-magnets $a'\ a'$ and the conductor B, which is technically termed the "exterior circuit." The current thus produced excites magnetism in the cores of the field-magnets, which in turn reacts upon the armature, and this action and reaction continues until the cores reach their maximum of magnetic intensity, or the increasing mutual attraction between the revolving and the stationary parts of the generator checks the speed of the armature, when an equilibrium is established between the mechanical resistance produced by the magnetism developed and the force which is exerted to make the armature revolve, and the current developed will remain practically uniform so long as the resistance of the exterior circuit, B, remains unchanged. When the conductor B, which unites the opposite poles of the generator, is of comparatively small resistance—that is to say, not greatly exceeding that within the generator itself—it is termed a "shunt-conductor."

By an inspection of Fig. 1 it will be observed that the armature, field-magnets, and shunt form a continuous closed circuit, which has, in accordance with the well-known laws of electrical action, one point of maximum positive potential, one point of maximum negative potential, and two points of minimum or zero potential, one of which latter is in the middle of the generator, at a point which is midway in respect to electrical resistance between the opposite poles of the generator, or, in other words, the points of maximum, positive, and negative potential, while the other zero-point occupies a similar position at or near the middle of the shunt-conductor. If, now, a group of two or more telegraph-lines be connected to this closed circuit at the point of maximum positive potential—the positive pole of the generator—as shown at D in Fig. 1, and these lines be all of them connected to the earth at G, and another group of lines, E, be connected in like manner to the negative pole of the generator, and to the earth at G', it is obvious that a positive current will traverse each wire of the group D and a negative current will traverse each wire of the group E, and that these two groups of wires taken together will constitute a closed circuit, one end of each being connected to the earth and the other directly with the generator A, and through that with the entire group of lines extending from the opposite pole of the generator, so that in fact each group of lines constitutes an earth-connection for the lines of the group on the opposite side, and therefore any one line of either group may be independently operated in the usual manner by closing or breaking the circuit by means of suitable keys or transmitters without perceptibly affecting the current in any other line. Furthermore, if we suppose that one of the wires in group E should be disconnected or opened, the first-mentioned line will still have an earth-connection through the remaining unbroken lines of group E. From these considerations it will be apparent that each of the groups D and E must be composed of at least two independent lines, in order that one circuit in each group may be opened and closed without interfering with the signaling on the lines in the other group, for if all the lines in one group were interrupted at the same time it will be obvious that the earth-connection of the lines in the other group would be destroyed, and they would consequently become inoperative.

In case the number of wires in each group is very large, as is usually the case in practice, it seldom or never occurs that more than about one-half of the wires in the group are interrupted at the same moment, and hence by the arrangement shown in Fig. 1 two entirely distinct groups of wires may be supplied with electricity from a single generator, one group receiving a positive and the other a negative current, and each line may be worked independently of all others, whether belonging to its own group or to the opposite one.

Fig. 2 represents a dynamo-electric generator situated at a central station and arranged to supply a number of wires of varying lengths and different polarities, the longest wire in the group being, say, three hundred and fifty miles in length.

A represents the dynamo-electric generator, and B the shunt-conductor, which permanently unites its opposite poles. The electro-motive force of the generator A is assumed to be one hundred volts, and its internal resistance half an ohm. The resistance of the shunt being greater than that within the generator, the heat developed in the circuit will manifest itself in the shunt-conductor B, and not within the generator. The conductor B may therefore with advantage be made of a broad thin ribbon of metal, as shown in Fig. 3, whereby the radiating-surface is rendered very great in proportion to the mass or sectional area of the conductor, and the heat generated is more rapidly dissipated than would otherwise be the case. If we assume the shunt B in Fig. 2 to be composed of a metallic ribbon of the above description, one hundred meters in length, and of uniform resistance throughout, it will be apparent that the point of minimum or zero potential must be in the center of the length of the conductor, or at the point marked 0, which is fifty meters from each end. The total electro-motive force of the generator being one hundred volts, one of its poles will have a maximum positive potential equal to fifty volts, and the other pole will have a maximum negative potential equal to fifty volts. As the increment of potential along the conductor is necessarily uniform from the zero-point to the pole of the generator in each direction, it follows that, reckoning from the zero-point along the shunt-conductor, there will be a gradual rise of potential equal to fifty volts in a distance of fifty meters.

C is a wire or other conductor, which is connected to the middle or zero-point of the shunt-conductor and terminates in the earth. Consequently the potential of the point 0 may be considered equal to that of the earth.

By a well-known electric law the strength of current traversing any given conductor is, other things being equal, in direct proportion to the difference of electric potential between its two terminals. Consequently in the organization shown in Fig. 2, if we connect a line to the shunt-conductor B at the proper point, any required electro-motive force and strength of current may be obtained for working such line, varying from 0 up to fifty volts, and these currents may be of either positive or negative polarity, as required. For example, the line $a$, being attached directly to the positive pole of the generator, with its other end terminating at the earth at E, has a strength of current which is represented by an electro-motive force of fifty volts divided by the total resistance of the circuit. This line may be provided with a key, $k$, and a receiving-instrument, $m$, at the central station, and a key, $k'$, and a receiving-instrument, $m'$, at the remote station, which may be employed for transmitting and receiving telegraphic communications in the usual manner.

$b$ represents a shorter line of somewhat less resistance than the line $a$, which is attached to the shunt-conductor B at a distance of forty meters from the zero-point, and which is therefore traversed by a positive current represented by an electro-motive force of forty volts divided by the resistance of the line.

$c$ is a very short line, which is attached to the shunt-conductor B at a distance of only five meters from the zero-point, and which consequently is supplied by an electro-motive force of five volts. The line $d$ in like manner is supplied by a force of ten volts, $e$ by thirty volts, $f$ and $g$ by fifty volts, all of negative polarity.

The line $h$ is of the same length as the line $a$ and runs parallel to it, terminating at the same point, but is supplied by a negative current having an electro-motive force of fifty volts.

The earth-wire C, being of very small resistance, serves to regulate the action of the entire system, for it will be apparent that, even if all the wires in the negative group were disconnected at the same time, the wires of the positive group would still have an earth-connection through the wire C, and vice versa, and that therefore the system is operative, even when only a single positive and a single negative line is connected with the generator.

In order to prevent any unnecessary waste of current, it is desirable that the wire C should be attached to the shunt-conductor B precisely at the zero-point of potential. In case a greater number of circuits are connected with one side of the machine than with the other, the zero-point will be shifted along the shunt-conductor toward that pole of the generator to which the smallest number of lines are connected, and it will then be advisable to correspondingly change the point of contact of the wire C. This may be effected by attaching it to a clamp, C', as shown in Fig. 3, which can be loosened by means of a screw and moved along the conductor and tightened again. The proper position of the earth-wire upon the shunt-conductor may be most conveniently determined by means of a galvanoscope, S, of any suitable construction, which will not be deflected when the wire C is connected at the proper point upon the shunt-conductor B, but will be deflected in one direction or the other if the connection is to the right or to the left of its proper place. The various circuits may be attached to the shunt-conductor by means of clamps similar to that shown at C' in Fig. 3, and the adjustment of these may be facilitated by means of a scale of equal parts marked upon and affixed to the conductor, as shown in the same figure.

I make no claim to the combination of a dynamo-electric generator with a shunt-conductor permanently uniting its opposite poles, either by itself or in combination with one or more telegraphic circuits, except when organized substantially in the manner hereinafter claimed; neither do I claim, broadly, the organization of circuits shown and described in the Patent of O. Lugo of December 21, 1880, No. 235,689, in which two or more telegraph-lines are attached to each of the opposite poles of a dynamo-electric generator, but only when said circuits are so organized that each line is independent of all the others in its operation, and can be opened and closed without necessarily interrupting the action of the others. I also disclaim in this application the combination of a dynamo-electric generator with a shunt-conductor permanently uniting its opposite poles, and one or more telegraph-lines attached to said shunt-conductor at a point or points between one pole of the generator and the zero-point of potential in said shunt-conductor, as this combination constitutes a part of the subject-matter claimed in another application for Letters Patent now pending, and of which this is a division.

I claim as my invention—

1. The combination, substantially as hereinbefore set forth, of a dynamo-electric generator, a shunt-conductor permanently uniting the opposite poles of said generator, and two or more independent telegraphic lines attached to each of the opposite poles of said generator, and terminating in the earth at their remote extremities.

2. The combination, substantially as hereinbefore set forth, of a dynamo-electric generator, a shunt-conductor permanently uniting the opposite poles of said generator, two or more telegraphic lines attached to each of the opposite poles of said generator and terminating in the earth at their remote extremities, and an earth-wire connected to said shunt-conductor at or near its zero-point of potential, midway between the positive and negative poles of the generator.

3. The combination, substantially as hereinbefore set forth, of a dynamo-electric generator, a shunt-conductor permanently uniting the opposite poles of said generator, an earth-wire connected to said shunt-conductor at or near its zero-point of potential, midway between the positive and negative poles of the generator, and one or more telegraph-lines attached to said shunt-conductor at a point or points between one pole of the generator and the point of attachment of said earth-wire.

4. The combination, substantially as hereinbefore set forth, of an earth-wire connected to a shunt-circuit permanently uniting the opposite poles of a dynamo-electric generator at or near its zero-point of potential, with a galvanoscope included in the circuit of said earth-wire.

In testimony whereof I have hereunto subscribed my name this 3d day of May, A. D. 1881.

FRANK L. POPE.

Witnesses:
MILLER C. EARL,
CHAS. A. TERRY.